United States Patent
Yu et al.

(10) Patent No.: US 9,561,547 B1
(45) Date of Patent: Feb. 7, 2017

(54) DEEP HOLE MACHINING ON-LINE DEVIATING CORRECTION DEVICE BASED ON LASER DETECTION

(71) Applicant: NORTH UNIVERSITY OF CHINA, Shanxi (CN)

(72) Inventors: Daguo Yu, Shanxi (CN); Xingquan Shen, Shanxi (CN); Yanlan Li, Shanxi (CN); Xiaobin Huang, Shanxi (CN); Chuangmin Wang, Shanxi (CN); Xiaoming Bo, Shanxi (CN); Baoluo Quan, Shanxi (CN); Zhen Dong, Shanxi (CN)

(73) Assignee: North University of China, Shanxi (CN)

( * ) Notice: Subject to any disclaimer, the term of this patent is extended or adjusted under 35 U.S.C. 154(b) by 0 days.

(21) Appl. No.: 14/966,480

(22) Filed: Dec. 11, 2015

(30) Foreign Application Priority Data

Nov. 13, 2015  (CN) .......................... 2015 1 0774720

(51) Int. Cl.
| | |
|---|---|
| *B23K 26/00* | (2014.01) |
| *B23B 41/02* | (2006.01) |
| *B23B 29/02* | (2006.01) |
| *G01S 17/42* | (2006.01) |

(52) U.S. Cl.
CPC ............. *B23B 41/02* (2013.01); *B23B 29/027* (2013.01); *G01S 17/42* (2013.01); *B23B 2260/092* (2013.01); *B23B 2260/128* (2013.01)

(58) Field of Classification Search
CPC .............. B23K 26/0652; B23K 26/064; B23K 26/0093; B23K 26/38; B23K 26/382; B23K 28/02; B23K 28/38; B23K 28/382; G01B 11/00
See application file for complete search history.

(56) References Cited

U.S. PATENT DOCUMENTS

| | | | | |
|---|---|---|---|---|
| 3,576,965 A | * | 5/1971 | Gugger .................. | B28D 1/221 |
| | | | | 219/121.7 |
| 4,822,974 A | * | 4/1989 | Leighton ............ | B23K 26/0652 |
| | | | | 219/121.67 |

(Continued)

*Primary Examiner* — Will Fridie, Jr.
(74) *Attorney, Agent, or Firm* — Lowenstein Sandler LLP; Jialin Zhong, Esq.

(57) ABSTRACT

The disclosure relates to a technical field of deep hole machining, particularly to a deep hole machining on-line deviating correction device based on laser detection, which solves the prior art problem of difficulty in the real-time, on-line detection and deviating correction in the process of deep hole machining. The device comprises a deep hole cutter and a cutter bar, and arranged on the cutter bar are a laser orientating block, a pyramid prism seat, the deep hole cutter and a metallic block with a heating device arranged therein. A beam emitted by a laser transmitter is orientated by the laser orientating block so as to be incident in parallel with the axis of the cutter bar, and then through a pyramid prism to form a return beam which reaches the photosensitive sensor. The advantages of the disclosure lie in that skewing of the deep hole cutter can be detected in time and skewing correction of the deep hole tool is achieved based on the heat expansion and cold contraction mechanism, and therefore the straightness and position accuracy during deep hole machining are improved.

6 Claims, 3 Drawing Sheets

(56) References Cited

U.S. PATENT DOCUMENTS

| | | | | |
|---|---|---|---|---|
| 5,808,740 | A * | 9/1998 | Tanaka | G01B 11/002 356/493 |
| 5,841,535 | A * | 11/1998 | Aoki | G01S 17/08 356/493 |
| 6,362,454 | B1 * | 3/2002 | Liu | B23K 26/0643 219/121.7 |
| 6,649,864 | B2 * | 11/2003 | De Steur | H05K 3/0032 219/121.7 |
| 7,842,901 | B2 * | 11/2010 | Wawers | G02B 27/40 219/121.67 |
| 2006/0277768 | A1 * | 12/2006 | van Rijen | B23D 59/003 30/388 |
| 2013/0228557 | A1 * | 9/2013 | Zediker | B23K 26/00 219/121.61 |
| 2014/0090846 | A1 * | 4/2014 | Deutch | E21B 29/00 166/297 |

* cited by examiner

DEEP HOLE MACHINING ON-LINE DEVIATING CORRECTION DEVICE BASED ON LASER DETECTION

RELATED APPLICATIONS

The present application claims priority to China Patent Application Serial No. CN 201510774720.8 filed on Nov. 13, 2015, which is hereby incorporated by reference in its entirety.

TECHNICAL FIELD

The disclosure relates to the technical field of deep hole machining, particularly to a deep hole machining on-line deviating correction device based on laser detection.

BACKGROUND

The term "deep hole" relates to a hole having a ratio of a hole length to a hole diameter that is greater than 5, such as a hollow spindle hole and a hydraulic valve hole. Some of these holes require high machining accuracy and surface quality, and sometime the materials to be machined have poor machinability. In the process of the deep hole machining, the operator is not able to directly inspect the conditions of the machined part and the cutter, but has to listen to the sound of cutting, observe the conditions of chips, tactually feel the vibration condition and the temperature of the workpiece and observe the meters such as oil pressure gauge and electric meter, so as to make experimental judgement on the conditions of the cutting process. All the above methods is incapable of detecting the axis deviation inside the deep hole, such that a continuous dynamic detection on the straightness of the deep hole part is not achieved and therefore inaccuracy occurs. Also, the cutter for the deep hole process has poor rigidity and difficulty in removing chips, which greatly impinge the straightness of the deep holes and therefore axis of these deep holes is liable to skew. Up to day, there are no simple and practical deep hole machining on-line deviating correction device and detection means used prior to the correction.

SUMMARY OF THE DISCLOSURE

Therefore, it is the object of the disclosure to address the prior art drawbacks and solve the problem of difficulty in inspecting the conditions of the machined part and the cutter. The disclosure is applicable to the deep hole machining processes in which a workpiece rotates and a deep hole cutter feeds, and the machining processes may detect the position of the deep hole cutter in real time by means of laser detection, and automatically adjust the position of the deep hole cutter as desired to revert it back to the correct, initial position.

In the disclosure the solution to the above object is provided: a deep hole machining on-line deviating correction device based on laser detection, comprising a deep hole cutter and a cutter bar, wherein the deep hole cutter is fixed to the cutter bar and one end of the cutter bar is fixed to a cutter bar support mounted on a slide plate which is rest onto a machine tool bed, wherein the other end of the cutter bar extends into a bore of a core sleeve nested with a tapered expansion bushing which is positioned in a bore of a spindle of a spindle box and contacts with a bore wall; wherein one end of the expansion bushing contacts with an end face of a retaining nut which is connected to a threaded portion of the core sleeve, and located in the bore of the spindle; wherein a contact portion between the core sleeve and the tapered expansion bushing is in form of a cone or cylinder when the spindle bore is configured as a tapered bore, and in form of a cone when the spindle hole is configured as a cylindrical bore; wherein the expansion sleeve is provided with a slot; wherein the cutter bar is provided with a plurality of metallic blocks arranged uniformly in the circumferential direction spaced from the deep hole cutter in a distance and each of the metallic blocks is provided with a heating device in the interior thereof and a wear/heat-resistant block on the top thereof; wherein the metallic block together with the wear/heat-resistant block form a radial profile dimension smaller than a diameter of a machined hole of the workpiece; wherein when the heating device is not heating up, the metallic block does not expand, and thus the wear/heat-resistant block on the top thereof makes no contact with an inner wall of the hole of the workpiece, and when the heating device is heating up, the metallic block expands, and thus the wear/heat-resistant block on the top thereof contacts with the machined inner wall of the hole of the workpiece; wherein the metallic blocks are located in a side of the machined hole and a pyramid prism seat is arranged between the metallic blocks and an end face of the machined deep hole and a pyramid prism is mounted onto the pyramid prism seat; wherein a laser transmitter and a photosensitive sensor are mounted to an outer frame in a height corresponding to the height range of the pyramid prism, and the outer frame is fixed to the machine tool bed; wherein the incident beam emitted by the laser transmitter is orientated by a laser orientating block so as to be in parallel with the initial axis of the cutter bar, and then the incident beam travels through a gap between the cutter bar and the workpiece and through the pyramid prism to form a return beam which travels backwardly through the gap between the cutter bar and the workpiece and reaches the photosensitive sensor which is connected to a computer.

The deep hole machining on-line deviating correction device based on laser detection is characterized in that the laser orientating block is mounted on the cutter bar, and positioned between the pyramid prism seat and the laser transmitter; wherein the laser orientating block is provided with two pairs of light apertures, i.e., first light apertures and second light apertures; wherein the incident beam emitted by the laser transmitter travels forwardly through the first light apertures of the laser orientating block, and then through the pyramid prism so as to travel backwardly in parallel with the incident direction through the second light apertures; wherein the returning laser beam is in parallel with the axis of the cutter bar; wherein the laser orientating block is used in the laser orientating adjustment, and is retained or removed after the adjustment.

The deep hole machining on-line deviating correction device based on laser detection is characterized in that the deep hole cutter is in form of a boring cutter, a reamer, a drill bit or a honing tool.

The deep hole machining on-line deviating correction device based on laser detection is characterized in that the wear/heat-resistant block is made of cemented carbide.

The deep hole machining on-line deviating correction device based on laser detection is characterized in that the heating device is in form of an electrically resistive heating device, an electromagnetic heating device or an infrared heating device.

The deep hole machining on-line deviating correction device based on laser detection is characterized in that three or more metallic blocks are provided.

The disclosure takes full advantage of the property of laser and prism to on-line detect the position of the deep hole cutter. The laser transmitter on the outer frame transmits laser which is reflected by the pyramid prism and reaches the photosensitive sensor. The skewing of the deep hole cutter or the axis of the deep hole is reflected by the facular variation on the photosensitive sensor, and detection and deviating correction results are displayed by the computer in real time. The disclosure provides solution to correct the position of the deep hole cutter if it is deviating from its correct position, such that when the deep hole cutter is deviating to the right, the heating device on the right heats up to make the metallic block to expand, and thus the wear/heat-resistant block contacts with the inner wall of the workpiece hole, and pushes the deep hole cutter back to its correct position by interacted force, and similarly, when the deep hole cutter is deviating to the left, the heating device on the left heats up to make the deep hole cutter back to its correct position. In general, in the disclosure one or more heat devices heat up to correct the skewing of the deep hole cutter without stopping the process. The heating temperature is related to the required amount of correction.

When the deep hole cutter deviates from its correct position, the facular varies on the photosensitive sensor. An A/D converter may transform the variation to digital signals which may be received and processed by the computer. A power source is energized to output a direct voltage based on the output control signal from the computer, such that the heating device on the metallic block heats up to make the respective metallic block expands. Thereby the wear/heat-resistant block on the top of the metallic block contacts with the inner wall of the machined hole of the workpiece. It is for the first presented by the disclosure that the position of the deep hole cutter is corrected by the expansion of a metallic block to locate the deep hole cutter in the correct position.

The disclosure provides advantages of ensuring good straightness and position accuracy of the machined deep hole. Specifically, the advantages includes: Firstly, the laser transmitter and the photosensitive sensor are positioned on the outer frame, such that high temperature generated during the machining process is avoided from affecting the laser transmitter and the sensor. If one of the laser transmitter and the photosensitive sensor were to be positioned within the hole, it would be difficult to achieve the detection effect due to the generated high temperature. The disclosure takes full advantage of the parallel reflection of the laser beam produced by the pyramid prism to achieve the aforementioned effect. Secondly, by means of observing the graphics displayed on the computer, the position variation of the deep hole cutter is detected on line and thus the working conditions of the workpiece rotation and the deep cutter feeding during the machining process are obtained in time. Since the position variation of the deep hole cutter indirectly reflects the hole quality, the disclosure may be also applicable as a straightness inspection apparatus for the deep hole. Thirdly, when skewing of the deep hole cutter is detected, correction of deviation may be made in time. The cutter bar of the disclosure is provided circumferentially with metallic blocks having the heating devices therein and the wear/heat-resistant devices on the top thereof. The heating devices are electrically resistive heating device, electromagnetic heating device or infrared heating device, with a compact footprint, high resolution of displacement, quick response and great output force, such that it is possible to adjust the position of the deep hole cutter in time by means of the heating device. What is particularly important is that the disclosure corrects skewing of the deep hole cutter based on the heat expansion and cold contraction theory. Since it only needs to lead a wire to the components such as electrical resistance, a compact structure is achieved. In general, the disclosure improves the solution to correction of the deep hole machining deviation.

BRIEF DESCRIPTION OF THE DRAWINGS

The present disclosure is illustrated by way of example, and not by way of limitation, in the figures of the accompanying drawings.

The components in the figures: 1—spindle box, 2—spindle, 3—expansion bushing, 4—retaining nut, 5—core sleeve, 6—clamper, 7—workpiece, 8—fastening screw, 9—deep hole cutter, 10—metallic block, 11—pyramid prism seat, 12—pyramid prism, 13—cutter bar, 14—center support, 15—laser transmitter, 16—photosensitive sensor, 17—computer, 18—cutter bar support, 19—slide plate, 20—machine tool bed, 21—wear/heat-resistant block, 22—heating device, 23—outer frame, 24—laser orientating block, 25—first light aperture, 26—second light aperture.

DETAILED DESCRIPTION

The embodiments of the disclosure may be described below in detail with reference to accompanying drawings. These embodiments should be construed as describing the disclosure, but not for limiting the scope of the disclosure.

Figure 1:
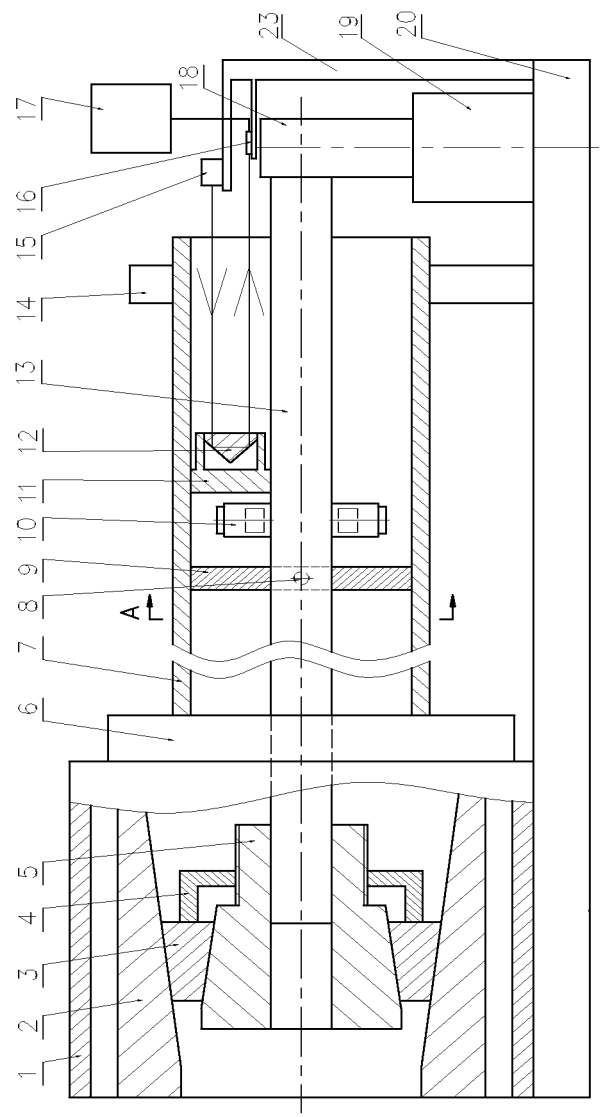
FIG. 1 shows a structurally schematic view according to an embodiment of the present disclosure.
Figure 2:
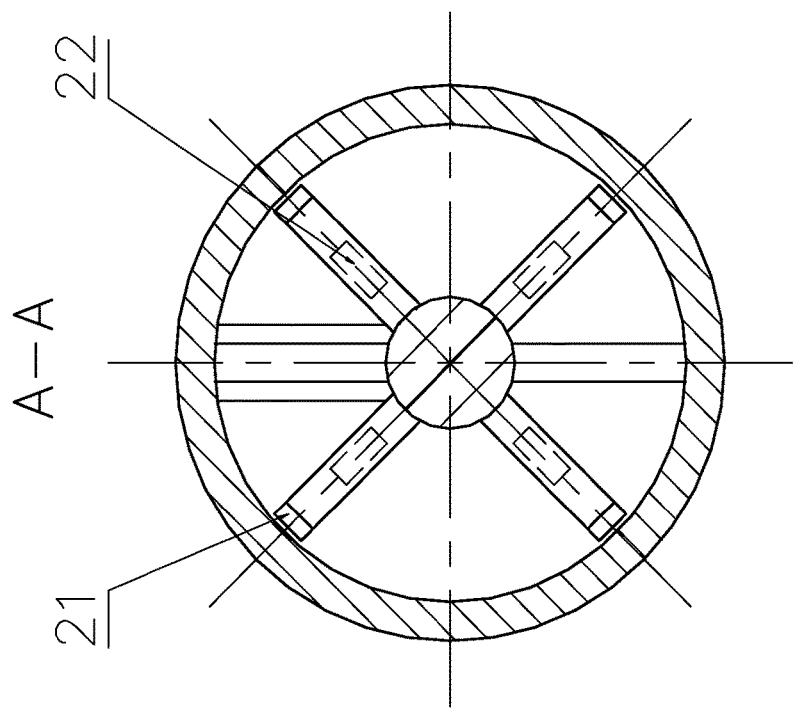
FIG. 2 shows a structurally schematic view of cutter bar in the axial direction according to an embodiment of the present disclosure.
Figure 3:
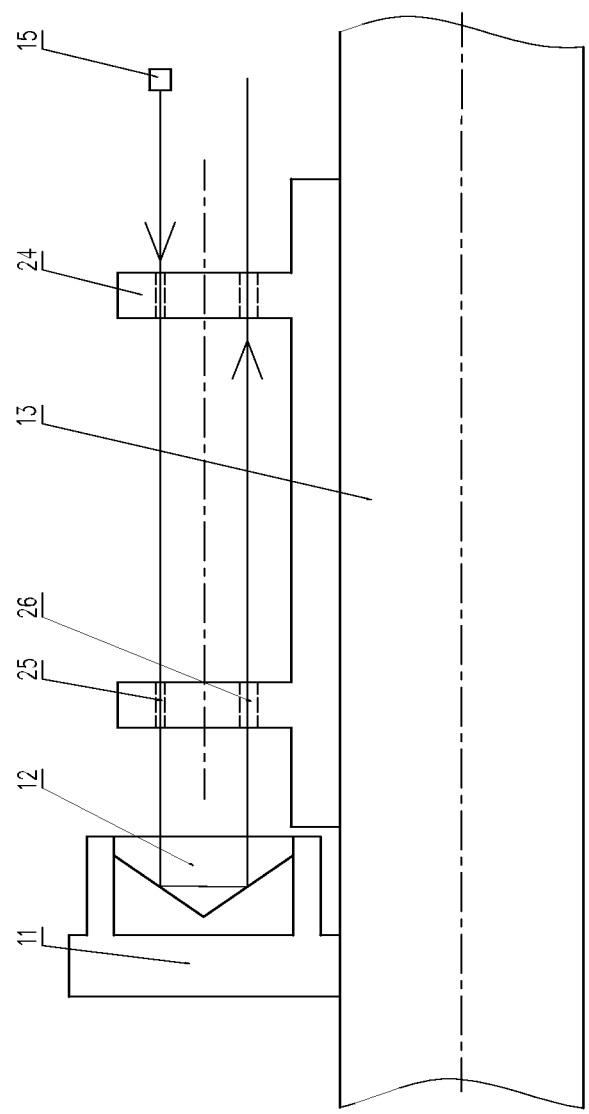
FIG. 3 shows a schematic diagram of laser orientation according to an embodiment of the present disclosure.

In the first embodiment, as shown in FIGS. 1-3, a workpiece 7 rotates and a deep hole cutter 9 feeds. The workpiece 7 is provided with a bottom hole, and a deep hole with a horizontal axis is to be machined.

In the disclosure, provided are a deep hole cutter 9, a cutter bar 13, a spindle box 1, a spindle 2, an expansion bushing 3, a retaining nut 4, a core sleeve 5, a clamper 6, a fastening screw 8, a metallic block 10, a pyramid prism seat 11, a pyramid prism 12, a center support 14, a laser transmitter 15, a photosensitive sensor 16, a computer 17, a cutter bar support 18, a slide plate 19, a machine tool bed 20, a wear/heat-resistant block 21, a heating device 22, an outer frame 23, a laser orientating block 24 and the like. The deep hole is machined by means of the rotation of the workpiece 7 and the feed of the deep hole cutter 9. One end of the workpiece 7 is held by the clamper 6, the other end is supported by the center support 14, and the rotation of workpiece is powered by the machine tool.

The deep hole cutter 9 is fastened to the cutter bar 13 by means of the fastening screw 8. One end of the cutter bar 13 is fixed to the cutter bar support 18 mounted to the slide 19 which is placed onto the machine tool bed 20, the other end of the cutter bar 13 extends into a bore of the core sleeve 5 nested with the tapered expansion bushing 3 which is located in a bore of the spindle 2 of the spindle box 1 and contacts with a wall of the bore. One end of the expansion bushing 3 contacts with the retaining nut 4 which is connected to a threaded portion of the core sleeve 5 and is located in the bore of the spindle 2. A contact portion between the core sleeve 5 and the expansion bushing 3 is in form of a cone or cylinder when the spindle bore is configured as a taper bore, and the contact portion is in form of a cone when the spindle bore is configured as a cylindrical bore. The expansion bushing 3 is provided with three or four axially elongated slots equally spaced, forming a radially convergent jaws such that the contraction of the expansion bushing 3 is possible. The cutter bar 13 is provided with a plurality of metallic blocks 10 evenly in the circumferential direction adjacent to the deep hole cutter 9 and each of the metallic block 10 is provided with a heating device 22 in the interior thereof and a wear/heating resisting block 21 on the top thereof. The metallic block 10 together with the wear/heating resisting block 21 form a radial dimension smaller than the diameter of a bored hole of the workpiece 7. When the heating device 22 is not heating up, the metallic block 10 does not expand, and thus the wear/heating resisting block 21 on the top does not contact with the inner wall of the hole of the workpiece 7; and when the heating device 22 is heating up, the metallic block 10 expands, and thus the wear/heating resisting block 21 on the top contacts with the inner wall of the hole of the workpiece 7. The metallic block 10 is located at a side of the machined hole. The pyramid prism seat 11 is arranged between the metallic blocks 10 and the end face of the machined deep hole, and the pyramid prism 12 is mounted onto the pyramid prism seat 11. The laser transmitter 15 and the photosensitive sensor 16 are mounted onto the outer frame 23, i.e. outside of the workpiece, in a height corresponding to the height range of the pyramid prism 12. The outer frame 23 is fixed to the machine tool bed 20. The incident beam emitted by the laser transmitter 15 is orientated by the laser orientating block 24 so as to be in parallel with the initial axis of the cutter bar 13. The incident beam travels through the gap between the cutter bar 13 and the workpiece 7 and then through the pyramid prism 12 to forms a return beam. The return beam travels backwardly through the gap between the cutter bar 13 and the workpiece 7 and reaches the photosensitive sensor 16 which transmits the signals to the computer 17. The return beam is in parallel with, but in opposite direction to the incident beam. The signals received by the computer 17 are analyzed to calculate the deep hole straightness. In the process of machining the deep hole, if the deep hole cutter 9 deviates from the correct, initial position, the facular on the surface of the photosensitive sensor 16 varies. The information regarding facular variation is then transmitted to the computer 17, the power source is energized to output certain value of direct voltage based on the output control signals from the computer 17.

The laser orientating block is provided with two pairs of light apertures including first light apertures 25 and second light apertures 26. The laser beam is adjusted to travel forwardly through the pair of the first light apertures 25 of the laser orientating block 24, and then through the pyramid prism 12 to travel backwardly in parallel with the incident direction and through the pair of the second light apertures 26. The laser beam is in parallel with the axis of the cutter bar 13.

The second embodiment is similar to the first embodiment except that in the second embodiment, the workpiece 7 is provided with no bottom hole and a deep hole with a horizontal axis is to be machined. In this case, there is no expansion bushing 3, retaining nut 4, or core sleeve 5.

What is claimed is:
1. A deep hole machining on-line deviating correction device based on laser detection, comprising:
a deep hole cutter; and
a cutter bar, wherein the deep hole cutter is fixed to the cutter bar and one end of the cutter bar is fixed to a cutter bar support mounted on a slide plate which rests on a machine tool bed, wherein another end of the cutter bar extends into a bore of a core sleeve nested with a tapered expansion bushing which is positioned in a bore of a spindle of a spindle box and contacts with a wall of the bore, wherein one end of the expansion bushing contacts with an end face of a retaining nut which is connected to a threaded portion of the core sleeve, and located in the bore of the spindle, wherein a contact portion between the core sleeve and the tapered expansion bushing is in a form of one of a cone or cylinder when the spindle bore is configured as a tapered bore, and the contact portion is in a form of a cone when the spindle bore is configured as a cylindrical bore, wherein an expansion sleeve is provided with a slot, wherein the cutter bar is provided with a plurality of metallic blocks arranged uniformly in a circumferential direction adjacent to the deep hole cutter and each of the metallic blocks is provided with a heating device in an interior thereof and a wear/heat-resistant block on a top thereof, wherein the metallic block together with the wear/heat-resistant block form a radial profile dimension smaller than a diameter of a machined hole of a workpiece, wherein when the heating device is not heating up, the metallic block does not expand, and thus the wear/heat-resistant block on the top thereof makes no contact with an inner wall of the hole of the workpiece, and when the heating device is heating up, the metallic block expands, and thus the wear/heat-resistant block on the top thereof contacts with the inner wall of the hole of the workpiece, wherein the metallic blocks are located in a side of the machined hole, a pyramid prism seat is arranged between the metallic blocks and an end face of the machined hole, and a pyramid prism is mounted onto the pyramid prism seat, wherein a laser transmitter and a photosensitive sensor are mounted to an outer frame in a height corresponding to a height range of the pyramid prism, and the outer frame is fixed to the machine tool bed, wherein an incident beam emitted by the laser transmitter is orientated by a laser orientating block so as to be in parallel with an initial axis of the cutter bar, and then the incident beam travels through a gap between the cutter bar and the workpiece and then through the pyramid prism to form a return beam which travels backwardly through the gap between the cutter bar and the workpiece and reaches the photosensitive sensor which is connected to a computer.

2. The deep hole machining on-line deviating correction device based on laser detection according to claim 1, wherein the laser orientating block is mounted on the cutter bar, and positioned between the pyramid prism seat and the laser transmitter, wherein the laser orientating block is provided with first light apertures and second light apertures, wherein the incident beam emitted by the laser transmitter travels forwardly through the first light apertures of the laser orientating block and then through the pyramid prism so as to travel backwardly in parallel with an incident direction through the second light apertures, wherein the returning laser beam is in parallel with the axis of the cutter bar, wherein the laser orientating block is used in the laser orientating adjustment, and is one of retained or removed, after the adjustment.

3. The deep hole machining on-line deviating correction device based on laser detection according to claim 1, wherein the deep hole cutter is in a form of one a boring cutter, a reamer, a drill bit, or a honing tool.

4. The deep hole machining on-line deviating correction device based on laser detection according to claim 1, wherein the wear/heat-resistant block is composed of cemented carbide.

5. The deep hole machining on-line deviating correction device based on laser detection according to claim 1, wherein the heating device is in a form of one of an electrically resistive heating device, an electromagnetic heating device, or an infrared heating device.

6. The deep hole machining on-line deviating correction device based on laser detection according to claim 1, wherein the plurality of metallic blocks comprise three or more metallic blocks.

* * * * *